United States Patent Office 3,484,170
Patented Dec. 16, 1969

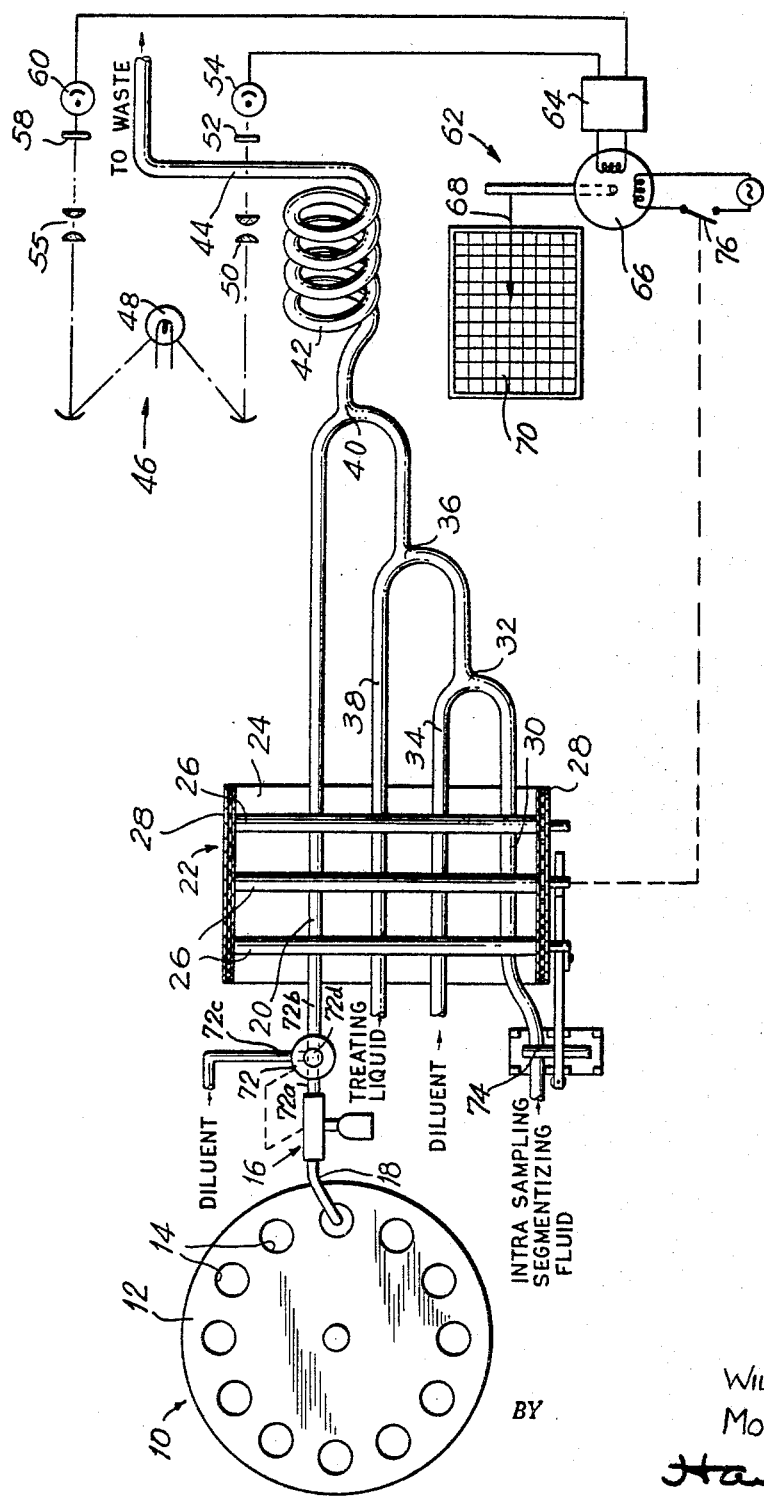

3,484,170
AUTOMATIC ANALYSIS METHOD AND APPARATUS
William J. Smythe, Rye, and Morris H. Shamos, New York, N.Y., assignors to Technicon Corporation, a corporation of New York
Continuation-in-part of application Ser. No. 369,695, May 25, 1964. This application Apr. 14, 1966, Ser. No. 542,488
Int. Cl. G01j 1/50
U.S. Cl. 356—181          5 Claims

ABSTRACT OF THE DISCLOSURE

An automatic analysis apparatus includes an indexible table supporting a plurality of liquid sample containers, an off-take tube for withdrawing samples therefrom, a source of liquid silicone and a periodically operated valve for dividing the flowing stream of sample liquid with segments of silicone, a processing manifold, and a colorimeter having a flow cell through which the sample and silicone segments pass. A chart recorder is coupled to the colorimeter for recording the optical density of the samples, and means are provided for rendering the stylus drive mechanism non-operational when an interface between a sample and a silicone segment passes through the light path of the flow cell.

---

This application is a continuation-in-part of our copending application Ser. No. 369,695, filed May 25, 1964.

This invention relates to the automatic quantitative analysis of a plurality of liquid samples for a constituent of interest in each of the samples.

Automatic analysis apparatus of this type was early taught in U.S. Patents 2,797,149 and 2,879,141 issued to Leonard T. Skeggs. The samples are stored in individual containers in a tray which is intermittently indexed to successively present each of the containers to an off-take mechanism. The off-take mechanism includes a tube, which is inserted into each presented container, and a peristaltic type pump, which provides suction in this tube, to transmit the samples successively into a conduit system as a flowing stream of samples. A small segment of atmospheric air is provided in the stream between each of the samples as the off-take tube moves between two successive sample containers. Various streams of diluents, reagents, or other treating liquids are added to the sample stream as it flows through the conduit system to provide, for example, a pigment in each sample whose optical density at a given wavelength, or whose intensity of light emission at a given wavelength when heated, is responsive to the concentration of the constituent of interest therein. The treated sample stream is then passed through a suitable analytic instrument, for example, a colorimeter or a flame photometer, to measure the optical density or light emission of each sample.

It was found that the interface of the liquid and gas segments was effective in washing the interior walls and, therefore, to minimize contamination of a succeeding sample by a preceding sample, additional segments of air, called intrasample segments, were inserted into each sample in the flowing sample stream at the upstream end of the conduit system. It was also found, as taught in U.S. Patent 2,933,293 issued to Andres Ferrari, Jr., that these intrasample segments served to compartmentalize proportional quantities of sample and treating liquids to ensure uniform and proportional intermixing of the sample and treating liquids along the length of the sample.

It was found, however, that the use of air or other gases as the intrasample segmentizing fluid provided at least one disadvantage, viz: gases are compressible and may cause pulsations or foaming in the system. It was taught in U.S. Patent 3,047,367, issued to Gerald Kessler, to utilize a liquid, which is immiscible with an inert to the sample or treating liquids, as the intrasample segmentizing fluid, to preclude this disadvantage.

In each of the foregoing teachings it has been taught that the intrasample segmentizing fluid, whether a gas or a liquid, is to be removed from the treated sample stream prior to its passage through the analytic instrument, such as the colorimeter or flame photometer. Indeed, in the whole prior art of colorimetry it has been customary to avoid the passage of fluids foreign to the sample and treating liquids through the colorimeter during the interval that the sample is passing through the colorimeter.

We have discovered that, contrary to the customary practice, it is not necessary to remove the intrasample segmentizing fluid from the treated sample stream prior to its passage through the analytic instrument. In fact, it is advantageous to pass the intrasample segmentizing fluid through the analytic instrument. Thus, the intrasample segmentizing fluid provides its cleansing function throughout the entire analytical system including the analytic instrument. Since the intrasample segmentizing fluid is inserted into the sample stream at regular, predetermined intervals, it passes through the analytic instrument at regular, predetermined intervals, and the output signal provided by the analytic instrument in response to the intrasample segmentizing fluid may be easily distinguished from the output signal provided in response to the treated sample liquid.

Therefore, an object of this invention is the provision of a method, and an apparatus therefor, for cleansing the entire analytical system, including the analytic instrument.

A feature of this invention is the provision of an intrasample segmentizing fluid which is passed through this treating conduit system and the analytic instrument.

These and other objects and features of this invention will become apparent from the following specification taken in conjunction with the accompanying drawing in which:

The figure is a diagram of an embodiment of this invention.

The analytical system comprises a sample supply apparatus 10, such as is shown in U.S. Patent 3,038,340 issued to Jack Isreeli. The sample supply apparatus 10 includes a tray 12 which supports a plurality of sample containers 14 adjacent its periphery and is intermittently indexed by a drive mechanism, not shown, which may include a Geneva gear. An off-take mechanism 16 is disposed adjacent the tray and has an off-take tube 18 which has one end which may be inserted successively into each container 14 as the tray is indexed to successively present each container to the off-take mechanism.

The other end of the off-take tube 18 is coupled to the upstream end of a pump tube 20 which is disposed in a peristaltic type pump 22, such as is shown in U.S. Patent 2,935,028 issued to Andres Ferrari, Jr. et al. The pump 22 includes a platen 24 underlying a plurality of pump tubes, and a plurality of rollers 26 overlying said tubes and supported at each end by endless chains 28. The rollers in succession engage, progressively occlude along their lengths and release all of the pump tubes concurrently, thereby advancing fluids through the tubes.

A pump tube 30 has its upstream end coupled to a source, not shown, of intrasample segmentizing fluid, and its downstream end coupled to one outlet of a first junction 32. A pump tube 34 has its upstream end coupled to a source, not shown, of a diluent liquid, and its downstream end coupled to another inlet of the first junction 32. The outlet of the first junction is coupled to one inlet of a second junction 36. A pump tube 38 has its upstream end coupled to a source, not shown, of treating liquid, and its downstream end coupled to another inlet of the second junction 36. The outlet of the second junction is coupled to one inlet of a third junction 40. The downstream end of the pump tube 20 is coupled to the other end of the third junction 40. The outlet of the third junction is coupled to the upstream end of a helical mixing coil 42, such as is shown in U.S. Patent 2,933,293 issued to Andres Ferrari, Jr. It will be understood that the internal diameters of pump tubes 20, 30, 34 and 38 are in accordance with the required flow rates of the fluids passing therethrough.

The downstream end of coil 42 is connected to the flow cell 44, which is preferably a tube, a portion at least of which is transparent for the passage of light therethrough. Said flow cell is part of a colorimeter 46 which also includes a light source 48, light focusing means 50, a light filter 52, and a light detector 54. The light detector provides an output signal which is responsive to the optical density of the fluid in the light path in the flow cell between the light focusing means 50 and the light filter 52 at the wavelength selected by the filter. An additional light focusing means 55, a light filter 58 and a light detector 60 are also provided as a reference. The outputs from both light detectors are coupled to the input of a recorder 62 having a null balancing network 64 driving a two phase motor 66, as shown in the U.S. Patent 3,031,917 issued to Milton H. Pelavin. The motor traverses a stylus 68 across a moving chart 70.

The analytical system which has been so far described may be operated in various modes. The intrasample segmentizing fluid, which as part of the treated sample stream is passed through the flow cell 44, must be inert to the sample liquid and also immiscible to the sample liquid. Such an intrasample segmentizing fluid may be either a gas, such as air, or a liquid.

If air is utilized as the intrasample segmentizing fluid, it may be provided by inserting and removing the off-take tube 18 several times in the same sample container while off-taking the sample liquid contained therein, while the pump tubes 30 and 34 are omitted from the system. It is necessary that each segment of intrasample segmentizing fluid be of large enough volume to fully occlude the internal cross-sectional area of any conduit through which it passes. If it is not convenient or feasible to maintain the off-take tube 18 out of a container long enough to aspirate a large enough volume of air for each segment, then an off-take tube, not shown, but similar to 18, may be coupled to the inlet of the pump tube 38, and inserted and removed from the source of treating liquid in phase with the movement of the off-take tube 18. This will provide additional segments of air through the tube 38 which will be added, in phase, to the segments of air coming through the tube 20, at the junction 40.

More conveniently, air, or other gas to which the various liquids are inert, is aspirated through the pump tube 30 as a stream and is added to a stream of diluent from the pump tube 34 at the junction 32. The segmentized diluent stream is added to the unsegmentized treating liquid stream from the pump tube 38 at the junction 36. This stream is now added to the sample liquid stream from the pump tube 20 at the junction 40, maintaining the periodicity of the air segments established at the junction 32.

As mentioned previously, a liquid which is immiscible with and inert to the sample liquid, and to the treating liquids also, may be utilized instead of a gas as the intrasample segmentizing fluid. We have found that silicones, such as "Dow 200" are suitable for this purpose. The liquid is provided through the pump tube 30 as a stream and is added to a stream of diluent from the pump tube 34 at the junction 32 to establish a regular spacing of the segmentizing liquid in the diluent stream. This stream is now added to the sample liquid stream from the pump tube 20 at the junction 40, maintaining the periodicity of the segmentizing liquid segments established at the junction 32. This stream is now passed through the mixing coil and the flow cell as previously described.

If it is desired to operate the system with a liquid as the intrasample segmentizing fluid and to preclude the admission of air into the sample stream as between samples when the off-take tube 18 is traveling between containers, this may be readily accomplished by the insertion of a two-inlet-one-outlet valve 72. The downstream end of the off-take tube 18 is coupled to one inlet 72a of the valve, and the upstream end of the pump tube 20 is coupled to the outlet 72b of the valve. The other inlet 72c of the valve is coupled to a source of diluent, not shown. The valve stem 72d is coupled, either mechanically by linkages, or electrically by a snap-action switch and a solenoid, all not shown, to the off-take mechanism 16. When the off-take tube 18 is disposed within a sample container 14, the valve stem is positioned to couple the first inlet 72a to the outlet 72b. When the off-take tube is moving out of a sample container, between sample containers, or moving into a sample container, the valve stem is positioned to couple the second inlet 72c to the outlet 72b. Thus diluent is added to the sample stream in lieu of atmospheric air between samples.

If it is desired to rigorously insure the periodicity of the intrasample segmentation, whether gas or liquid, the apparatus taught in U.S. Patent No. 3,306,229, issued on Feb. 28, 1967 to W. J. Smythe, may be utilized. Here a pinch valve 74 normally closes the pump tube 30, and is periodically actuated by the endless chain and roller mechanism of the pump to periodically release the pump tube 30 to admit the intrasample segmentizing fluid into the system.

If it is desired to preclude the stylus from making major traversals when the interface of the treated sample and segmentizing fluid passes through the light path of the flow cell a switch 76 may be inserted in the line feed phase winding of the motor 66. The switch is mechanically or electrically coupled, with suitable time delays if necessary to maintain the proper phase relation, to the actuating mechanism for the pinch valve 74.

While we have shown and described the preferred embodiment of the invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims.

What is claimed is:

1. A method of analysis of a plurality of liquid samples, comprising:
   transmitting the samples successively to form a flowing stream of samples,
   spacing successive samples apart by a liquid silicone which is substantially immiscible with and inert to the liquid samples; and
   passing the flowing stream of samples and silicone through an analytic instrument to measure a characteristic of said sample.

2. A method of analysis as defined in claim 1 including the further steps of:
   dividing each of the samples into a plurality of successive segments spaced apart by a liquid silicone which is substantially immiscible with and inert to the liquid samples; and
   passing the flowing stream of intrasample segmentized samples including the intrasample segmentizing liquid silicone, through an analytic instrument to measure a characteristic of said sample segments.

3. A method according to claim 2 wherein the flowing stream through the analytic instrument consists solely of liquids.

4. Apparatus for the analysis of a plurality of liquid samples, comprising:
  means for transmitting the samples successively to form a flowing stream of samples;
  means coupled to said transmitting means and including a source of liquid silicone for dividing each of the samples into a plurality of successive segments spaced apart by liquid silicone which is substantially immiscible with and inert to the liquid samples; and
  an analytic instrument for measuring a characteristic of said sample segments coupled to said dividing means for receiving therethrough said flowing stream of sample and silicone segments.

5. Apparatus according to claim 4 wherein
  said analytic instrument is a colorimeter including a flow cell and a light path therethrough for the measurement of the optical density at a particular wavelength of the contents of the flow cell, said flowing stream of sample and silicone segments passing through said light path.

References Cited

UNITED STATES PATENTS

| | | | |
|---|---|---|---|
| 2,797,149 | 6/1957 | Skeggs | 23—253 X |
| 3,098,719 | 7/1963 | Skeggs | 23—253 |
| 3,282,651 | 11/1966 | Ferrari et al. | 23—230 X |

JOSEPH SCOVRONEK, Primary Examiner

U.S. Cl. X.R.

23—230, 253; 73—423; 356—201